Patented Oct. 15, 1940

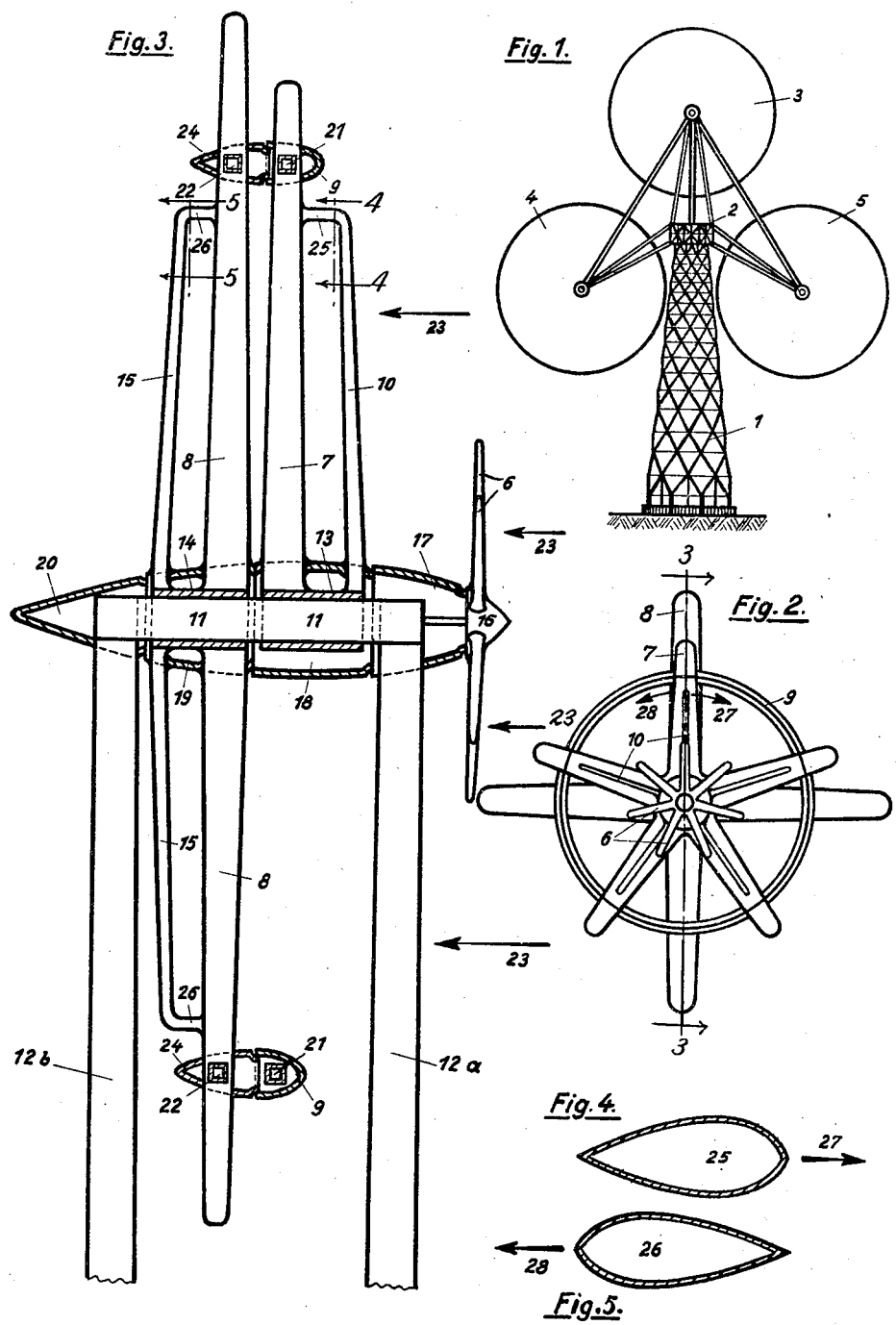

2,217,950

UNITED STATES PATENT OFFICE 2,217,950

WIND-OPERATED POWER GENERATOR

Hermann Honnef, Berlin, Germany

Application November 27, 1937, Serial No. 176,807
In Germany November 27, 1936

7 Claims. (Cl. 170—38)

The wind wheels of wind-operated power generators are in most cases mounted on a tower and are so arranged as to have a horizontal axle directed towards the wind. Their efficiency is best if the shape of the blades and the rotary speed are so chosen that the air, after passing through the wind wheel, moves with about one-third of the speed with which it impinges upon the same. Consequently, even in the theoretically most favorable case, only two-thirds of the kinetic energy of the transverse section of the air flow can be transformed into energy of rotation.

In order to utilize the wind energy remaining available behind the wind wheel, it has already been proposed to arrange two or even three wind wheels on a common axle one behind another. In the most favorable case the speed of the air flow behind the second wind wheel will sink to one-ninth of the original speed of the wind, so that about 90% of the kinetic energy of the transverse section of the air flow will be transformed into energy of rotation.

Experiments carried out in a wind tunnel have shown that these theoretical conditions can be approximated satisfactorily in practice only if care is taken that the wind wheels arranged on a common axle at no instant coincide, that is, cover completely one another. This can be attained by giving the several wind wheels different numbers of blades. It is best to choose such a relationship between the numbers of the blades of the coaxially arranged wind wheels that of these wheels always only one blade of the front wheel can coincide with, that is, cover at a certain instant of time, one blade of the wheel behind. It is a surprising feature that, in order to obtain the best efficiency, the rear wheel must always have the smaller number of blades. This phenomenon is probably connected with the necessity of providing sufficient deviation possibilities for the eddy zones arising behind the front wind wheel. Therefore, of two coaxially arranged wind wheels the front one of these wheels may be equipped, for instance, with seven blades and the rear one with five blades; or the front wheel may have four blades and the rear wheel three blades.

It is a matter of course that a third wind wheel may be provided behind the two above mentioned wind wheels in order to increase still more the utilization of the wind energy, but trials have shown that it is possible to attain the object in view with simpler means, viz., by giving the third wheel only about one-third of the diameter of the first of the two main wind wheels and by arranging the said third wheel at a distance in front of said two main wind wheels. The said distance may be about equal to the radius of the said third wheel, which then constitutes a so-called auxiliary wind wheel. The reason for this is that the efficiency of the inner third of each wind wheel is very small owing to the strong eddies arising there. This is true also of the "wind turbine" formed by the two above mentioned main wind wheels. If a smaller wind wheel utilizing the transverse section of flow of the inner third of said wind turbine is arranged at a suitable distance in front of the same, there will be obtained, with the aid of said auxiliary wind wheel, on the one hand, an increase of the output of nearly 10% and, on the other hand, the output of the main turbine will be increased owing to the reduction of the eddy losses at the main wind wheels.

The losses in the inner third of the main turbine are due chiefly to the fact that the individual wind blades must be comparatively broad in the proximity of the axis in order to have a sufficient static strength so that there is left free in the middle zone too small a transverse section for the escaping air. This disadvantage can be overcome by providing the individual wind wheels with rims connecting their blades with one another at a suitable distance from the axle, whereby the blades stiffen one another. In order to reduce the formation of eddies at said rims, they are preferably arranged behind one another and are provided with interengaging envelopes which are movable with respect to one another and constitute in their entirety a shell having a streamlined transverse section.

In order further to stiffen the wind wheel blades, it is also possible to provide parallel staying struts. These members also contribute to a static relief of the wind blade parts extending to the axle and therefore enable these parts to be made narrower, whereby a better utilization of the middle zone is obtained. Furthermore, in order to obviate disturbing eddy zones at the junctions of the said struts and the wind wheel blades, the end portions of the struts at the said junctions extend parallel to the axle. Said end portions are provided with a shell, the transverse section of which has the shape of a streamlined body, the axis of which runs peripherally.

The invention is illustrated diagrammatically and by way of example in the accompanying drawing in which—

Fig. 1 is a general view of a large wind-operated power generator constructed in accordance with the present invention;

Fig. 2 is a front elevation, on an enlarged scale, of one of the wind turbines indicated in Fig. 1;

Fig. 3 is a section, on the line 3—3 of Fig. 2, of the turbine system; and

Figs. 4 and 5 are sections on lines 4 and 5, respectively, through two details shown in Fig. 3.

Referring to Fig. 1, the lattice girder tower 1, the height of which amounts to about 300 meters, carries a rotary head piece 2 to which are attached three wind turbines 3, 4, and 5, by means of suitably designed and supported jibs. Each of said turbines (which are merely indicated by circles in Fig. 1) consists of a plurality of wind wheels arranged behind one another, their details being illustrated in Figs. 2 and 3. As shown in Fig. 2, the wind turbine 3 is composed of three wind wheels 6, 7, and 8 which are coaxially arranged, and of which 6 constitutes the auxiliary wind wheel mentioned in the introductory portion of this specification. Said wheel 6 is located in front of the wheels 7 and 8; its diameter is about one-third of the diameter of the wheel 7, and it is equipped with seven blades. The front main wind wheel 7 rotates in a clockwise direction and has only five blades which are connected with one another by a rim provided with a shell 9. The blades of this wind wheel are stayed by struts 10. The rear main wind wheel 8 rotates counter-clockwise and has only four blades which extend a little beyond the blades of the wind wheel 7 and are likewise connected with one another by a rim, which is not visible in the drawing, in that it is covered by the shell 9 of the front wind wheel 7. The two main wind wheels 7 and 8 together constitute a wind turbine. It appears from the drawing that, owing to the number of blades chosen for the constructional form shown by way of example, two blades of one and the same wind wheel (6, 7, 8) can never simultaneously coincide with two blades of another wind wheel. In this way the periodic changes of the free passage surface are brought to the smallest possible amplitude and to the greatest possible frequency, in consequence whereof the changes of the driving moment arising at the moment of the mutual covering or coincidence of two blades cannot entail disturbing shocks, but practically compensate each other.

As shown in Fig. 3, the tubular axle of the wind turbine 3 is supported by the jib-fork 12a—12b. On the axle 11 the hubs 13 and 14 are mounted for rotation. The hub 13 carries the wind wheel 7 with its supporting struts 10, and the hub 14 carries the wind wheel 8 with its supporting struts 15. At a considerable distance in front of the two main wind wheels 7 and 8 there is supported the wind wheel 6, the diameter of which is only about one-third of the diameter of the front wind wheel 7, as has already been mentioned in a preceding part of this specification. The entire axle and adjacent parts are provided with a streamlined shell which is divided into five sections which are movable relatively to one another. The tip 16 rotates with the auxiliary wind wheel 6; the sections 17 and 20 are stationary and are supported by the jib parts 12a and 12b; and the sections 18 and 19 rotate with the wind wheels 7 and 8 about the axle 11.

The rims which connect the blades of the individual wind wheels with one another consist of box-shaped lattice work constructions, the transverse sections of which are rectangular, as indicated at 21 and 22. In order to offer a minimum resistance to the wind blowing in the direction indicated by the arrow 23, the said two rims are arranged behind one another and carry overlapping shells 9 and 24 constituting together a casing of streamlined transverse section.

In order further to relieve the inner wind wheel zone, there are provided struts 10 and 15, and in order to prevent the formation of eddies at the junctions of the said struts and the wind wheel blades, the end portions 25 and 26 of the said struts 10 and 15 do not form acute angles with the blades of the wind wheels, but the said end portions 25 and 26 extend parallel to the axle. As the said end portions 25 and 26 run at a high speed in the directions indicated by the arrows 27 and 28 when the wind wheels are rotating, it is advisable to give to each of them the transverse section of a streamlined body, the axis of which extends in the direction of the periphery of the wind wheel, as indicated in Figs. 4 and 5.

I claim:

1. In a wind-operated generator, two wind wheels supported one behind the other on a common shaft and arranged to rotate independently in opposite directions and in the same air stream, the front wind wheel having a different number of blades than the rear wheel, and the number of blades in the front wheel being so related to the number of blades in the rear wheel that no more than one blade of the front wheel can ever be in exact alignment with a blade of the rear wheel.

2. In a wind-operated generator, a supporting shaft, an elongated hub mounted on said shaft, a plurality of radially extending blades secured to said hub near one end thereof, said hub and blades constituting a wind wheel, and a plurality of straight supporting or bracing struts for said blades, respectively, said struts being neutral as regards turning moment applied to the wind wheel, and each said strut being attached to said hub near the end opposite where the blades are attached and each strut extending substantially parallel to its associated blade to a point near the end thereof where it is secured to the blade by a straight section which is substantially perpendicular to the blade and is streamlined in the direction of the rotation of the wind wheel.

3. In a wind-operated generator, a supporting shaft, front and rear hubs rotatably supported by said shaft, said hubs being adjacent one another, a series of radial blades secured to the inner end of each hub so that the plane of one series of blades is close to the plane of the other series, said hubs and two series of blades constituting two wind wheels, a series of bracing struts secured to the forward end of the front hub and also to the blades which are mounted on the forward hub, and a second series of bracing struts secured to the rear end of the rear hub and to the blades mounted thereon.

4. In a wind-operated generator, two wind wheels supported close together on a common shaft and arranged to rotate in opposite directions, and means for bracing the blades of the rear wheel against the jolts which occur when such blades pass through eddy current zones caused by the blades of the front wheel, said means comprising a radial strut for each blade of the rear wheel, and a member which is streamlined in the direction of rotation of the wheel for connecting each strut to its associated blade.

5. In a wind-operated generator, two main wind wheels having blades arranged to drive them in opposite directions, means supporting said wind wheels for independent rotation on a common axis and in close proximity to each other, an auxiliary wind wheel located in front of said main wind wheels and having about one-third the diameter of the nearest of said main wind wheel, and means for supporting said auxiliary wind wheel for coaxial rotation with said main wind wheels at a distance from the nearest of said main wheels which is approximately equal to the radius of the auxiliary wind wheel.

6. In a wind-operated generator, two coaxially supported wind wheels rotating in opposite directions, each wheel having a plurality of radial blades, a circular rim for each wheel connecting together the blades thereof, and a circular streamlined shell covering both said rims, said shell comprising two separate sections secured to the two wind wheels, respectively.

7. In a wind-operated generator, a shaft, spaced supports for said shaft, two wind wheels mounted on said shaft between said supports by means of hubs, and a generally cigar-shaped streamlined shell enclosing the said shaft; supports and hubs, said shell comprising two fixed sections secured to said supports and two independently rotatable sections secured to the two wind wheels, respectively.

HERMANN HONNEF.